United States Patent [19]

Collot et al.

[11] Patent Number: 4,993,317
[45] Date of Patent: Feb. 19, 1991

[54] DEVICE FOR CONTROLLING THE BINDING OF PRESSED MATERIAL

[76] Inventors: Thierry Collot, Rue-Champy, Gondreville la Franche; Serge Pin, 21 rue des pervenches, 45700 Villemandeur, both of France

[21] Appl. No.: 348,415

[22] Filed: May 8, 1989

[30] Foreign Application Priority Data

May 11, 1988 [FR] France .................. 88 06402

[51] Int. Cl.$^5$ .................................. B65B 57/10
[52] U.S. Cl. .......................... 100/4; 56/343; 100/17; 100/43; 100/99; 200/61.18
[58] Field of Search ............ 100/4, 8, 17–24, 100/43, 99, 179; 56/343; 200/61.18

[56] References Cited

U.S. PATENT DOCUMENTS

| | | | |
|---|---|---|---|
| 2,824,184 | 2/1958 | Mandleco | 100/99 X |
| 3,513,464 | 5/1970 | Yarbro et al. | 100/99 X |
| 4,196,661 | 4/1980 | Yatcilla et al. | 100/4 |
| 4,269,116 | 5/1981 | Gordon et al. | 100/99 |
| 4,753,463 | 6/1988 | Strosser | 289/2 X |
| 4,765,235 | 8/1988 | Schrag et al. | 100/4 X |

FOREIGN PATENT DOCUMENTS

208748 4/1984 German Democratic Rep. .... 100/4

Primary Examiner—Harvey C. Hornsby
Assistant Examiner—Stephen F. Gerrity

[57] ABSTRACT

A device for controlling the binding of bales of material such as straw or fodder formed on an agricultural baling press fitted with a binding system, in which the loop of a binding material is made around the bale progressively during compression of the material, wherein a motor member cooperates with a second finger in order to return it from its retracted position to its active position, in response to the raising of a first finger by the binding material, and wherein a signal emitter is adapted to be energized in function of the rotation of the axle under the effect of the movement of the second finger, in such a manner as to indicate the absence or the rupture of the binding material during formation and knotting of the binding loop.

5 Claims, 5 Drawing Sheets

DEVICE FOR CONTROLLING THE BINDING OF PRESSED MATERIAL

BACKGROUND OF THE INVENTION

The present invention concerns a device for controlling the binding of pressed material in the form of parallelepiped bales. The disposition of the invention described herein-below concerns, by way of example, the forming of bales of straw or fodder, but can also apply to any similar material and particularly any kind of binding material.

In an agricultural press, the binding operation is generally carried out at the moment of forming the bale, the binding material being previously placed at the inlet of the bale case, between a needle through which the binding material is delivered and a knotting device, and is displaced progressively with the pressing of the straw or fodder in the bale case When the bale is completed, the binding material thus extends practically over three sides of the bale (two longitudinal sides and its front end side) and the needle brings back the initial end of binding material towards the knotting device in order to complete the last side and finish the loop by tying a knot.

It should be recalled that these operations are carried out to the rear of an agricultural tractor automatically while the operator drives the tractor along the windrow to be baled. It is thus necessary to advise the driver of the tractor rapidly of any defect appearing in the bundling or baling operation, in order to prevent him from wasting time, on the one hand, in bundling the bales which will not be knotted and, on the other hand, once he has noticed the defect, from again bundling bales that have not been knotted.

The most current bundling defect is provoked by incorrect operating of the closing of the loop by knotting or by another joining method. Faulty bundling arises either through the absence of binding material in the system, or through the absence of a knot.

Binding material detection devices exist whose object is to test the presence of the knot tied and to emit a defect signal if the knot is absent or untied at the time of the test. These devices comprise a finger which is inserted between the bale and the binding material and which constitutes an obstacle to the passage of the rear vertical strand of the loop, this finger being retractable in the case when the loop resists the spring force maintaining the finger on the path of the binding material. The introduction of this finger under the binding material operates in known devices in several ways.

In certain devices, the finger and its control members belong to the automation of the press baler and their operation is integrated in the operating cycle of the machine. These dispositions cannot be installed separately on presses other than those for which they are intended.

In other devices, the arm is shaped in such a way as to be progressively overmounted laterally by the binding material, progressively as the shaping of the bale advances. Its passage under the binding material is often uncertain since numerous factors, such as the quality of the binding material and the dirt accumulation of the various members prohibit reliable functioning of the binding material detection device.

In any case, even in the respect of correct functioning of these devices, the defect is detected too late, i.e. at the end of making up of the bale, so that the intervention of the operator can only correct the incorrect functioning for the following bales. There remains, in this case, at least one faulty bale requiring re-knotting which is time wasted.

SUMMARY OF THE INVENTION

The object of the present invention is to overcome these drawbacks by providing a device which quickly alerts the operator to the poor functioning of the binding system, by detecting the correct presence of the binding material even prior to the tying of the knot. Furthermore, the device according to the present invention has a universal application due to the fact that it is controlled independently from the cycle and the automatism is carried out on the baling presses. In fact, the power required for its operation and the control of its different formation sequences are ensured by the shaping of the bale itself as it progresses, whatever the actuating means and power means employed to realize the bale. It can thus be adapted to any simple machine, without implying modification to the machine's basic mechanism.

For this purpose, a more specific object of the invention is to provide a device for controlling the binding of bales of material such as straw or fodder formed on an agricultural baling press fitted with a binding system, in which the loop of binding material is directed around the bale progressively during compression of the material, comprising, on the one hand, a first finger or pin for detecting the presence of the binding material and which is placed above the binding material at a distance therefrom so that the upper horizontal strand of the binding material is brought into contact therewith during shaping of the bale and raises it progressively, and on the other hand, a second finger or arm for detecting the shaping of the binding loop which is placed in an active position between the binding material and the bale and which is adapted to be carried along an axis substantially perpendicular to the binding material by the passage of the rear vertical strand of the binding material, wherein a motor member cooperates with the second finger in order to recall it from a retracted position to the active position in response to the raising of the first finger by the binding material, and wherein a signal transmitter is adapted to be energized upon rotation of the axis under the effect of the movement of the second finger, in such a manner as to indicate the absence or breaking of the binding material during formation and knotting of the binding loop.

In a first embodiment of the invention, the motor member is constituted by a mechanical energy accumulation motor energized by the second finger during its driving by the binding material.

Furthermore, the first finger cooperates with a retaining abutment of the second finger in its retracted position, in an unstable position of the motor member opposed to the actuating of the second finger towards its active position which corresponds to the condition of the motor in which the accumulated energy level is the lowest.

In a first alternative of this embodiment, the second finger is constituted by each of the opposed ends of a bar hitched by its medium portion to the end of an axle driven by the motor member that comprises a spring blade or a lever resiliently returned on two abutments integral in rotation with the axle for driving the bar and each forming a cam surface adapted to engage upon a lever urged by a spring for pushing the second finger into the active position, when the retaining abutment is suppressed by the first finger.

In a second alternative, the first and the second fingers coincide into a single finger carried by a rotation axle which, on the one hand, is pivotally connected to a rocking axle perpendicular to this rotation axle and, on the other hand, is mounted by a coupling arm opposed to the single finger and of which an end snug slides into the radial groove of a disc turning about an axle parallel to the rotation axle of the single finger and includes a driving crank pin which engages a finger urged by a spring member in order to constitute a member driving in rotation of the disk and the control device comprises a retaining abutment which is adapted to abut the single finger pushed by the end snug urged by the rotation of the disk, as long as the finger is not pivoted about the rocking axle by the binding material.

In this case, the retaining abutment is spring mounted so as to be partially suppressed under the action of the rear vertical strand of the binding material on the finger, the spring returning force of the the abutment being however greater than the driving force developed by the accumulation motor in the position of the disk locked by this retaining abutment.

In the second embodiment of the invention, the motor member is constituted by a motor energized by an external power source, the first finger being connected to a control circuit of this motor, adapted to place the second finger in active position, while the retraction of the second finger is ensured by the binding material, to the passage of the vertical strand of this latter.

In the third embodiment, the motor member is constituted by a mechanical connection of the first and second fingers through the intermediary of a coupling member constituted by two fingers respectively integral with the corresponding transmission axis of the first and the second fingers and engaging upon each other.

Furthermore, it is advantageous that the signal transmitter cooperate with a sensor controling the advance of the bale in the baling press.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

Other aims, features and advantages will appear from the following description of various embodiments of the invention, given by way of non-limitative illustration with reference to the appended drawing, which are given by way of illustration only, and thus are not limitative of the present invention, and in which.

DETAILED DESCRIPTION

FIGS. 1-4 represent schematically a bale case 1 in which fodder or straw 2 is accumulated and pressed by a piston 3. The baling press also comprises a device for placing in position a binding material or twine 4 and which consists of a knotting device 5 to which is secured one of the ends of binding material 4, and a needle 6 through which the binding material is supplied. The knotting device 5 is placed above the bale case while the needle 6 is disposed below this latter.

Figure 1:
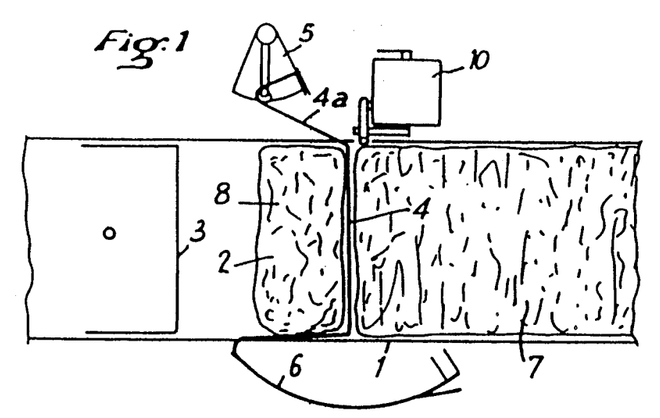
FIGS. 1-4 illustrate schematically the formation of a fodder bale in a machine equipped with the device according to the invention.
Figure 2:
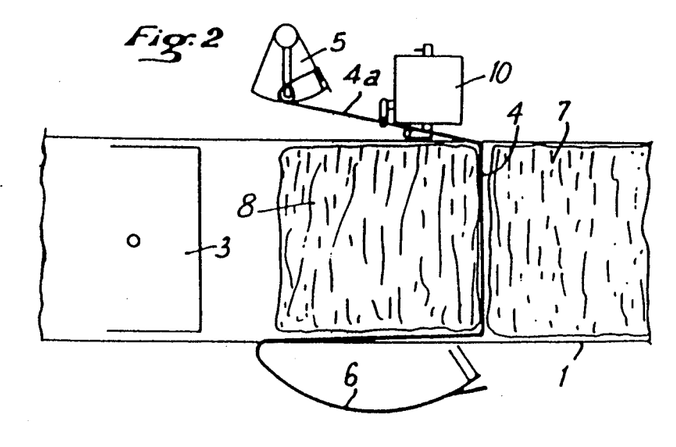
Figure 3:
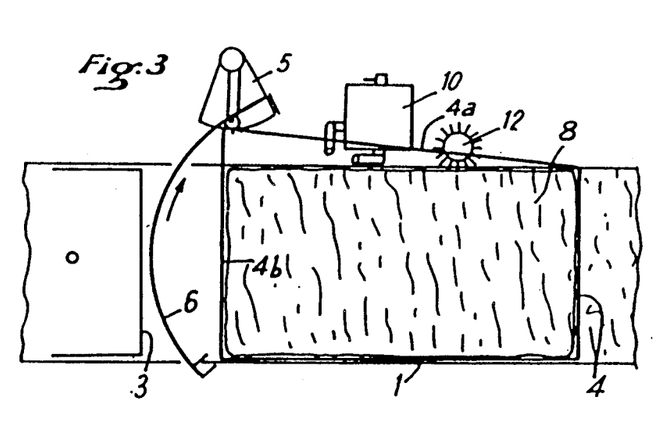
Figure 4:
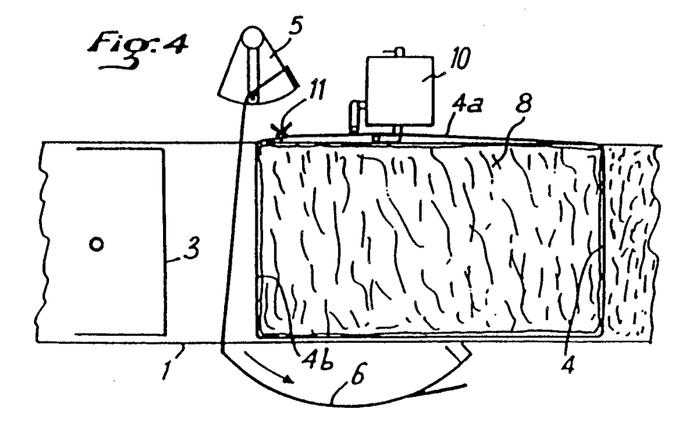

FIG. 1 shows a completed bale 7 while a following bale 8 is being made. The fodder is pushed towards the right of FIGS. 1 to 4 driving the binding material 4 of which the upper strand 4a is also drawn towards the right of the figures passing adjacent to the detection device 10 according to the invention. When the bale 8 is completed, the needle 6 drives the binding material 4 towards the knotting device 5, where the end of the binding material carried by the needle is attached to the other end of the binding material retained by the device 5. After tying the knot 11, the binding material 4 is completely closed on the bale 8 in order to present a vertical rear strand 4b. The needle 6 is withdrawn under the bale case 1 after having left the new end of the binding material retained in the knot 5.

It will be noted from FIGS. 1 to 4 that progressively while shaping the bale 8, the upper strand 4a of the binding material 4 is raised with respect to detection device 10. This relative movement, as will be seen hereafter, is used for the detecting the binding material It will be noted from FIG. 3 that a detector or sensor 12 for the bale advancing emits signals indicating the formation of the bale to thereby trigger the rocking of the needle 6 in order to proceed with knotting This sensor can also be used, with the detector according to the invention, to allow the emission of complete data (or a warning signal) in the direction of the driver's cabin of the agricultural tractor to which the press is hitched.

Figure 5:
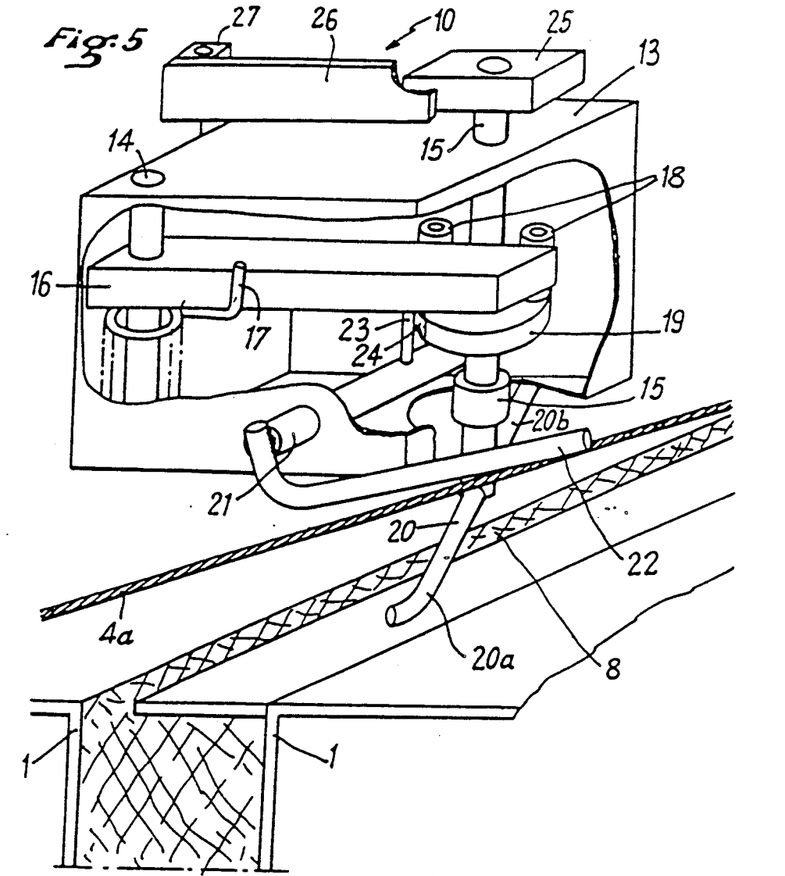
FIG. 5 represents schematically in perspective a first embodiment of the invention.

FIG. 5 shows the bale case 1 in which the bale 8 is being formed and the strand 4a of the twine laced up adjacent to the detection device 10. This device comprises a housing 13 that can be attached to the body of the press. This housing bears two vertically journaled hinging axles. Axle 14 hinges a lever 16 which is urged by a torsion spring 17 tending to turn the lever 16 about the axle 14 in a counterclockwise direction.

At its other end, the lever 16 cooperates with two abutments 18 carried by a disk 19 integral in rotation with axle 15. Under this disk 19, axle 15 is retracted in the direction of the strand 4a. At its end adjacent to this strand, the axle 15 carries a bar 20 forming two opposite fingers 20a and 20b which, according to the angular position of the axle 15, are placed in parallel or transversal to the direction of the strand 4a and under this latter.

The housing 13 also carries a third axle 21 substantially orthogonal to the axles 14 and 15, this axle presenting at its outer end relative to the housing 13 a lever 22 substantially perpendicular to the axle 21 and extending transversal to the strand 4a and above it. A radial lug 23, integral with the axle 21, can be housed in one of the two notches 24 provided at the periphery of the disk 19 and diametrically opposed. At its upper portion, the axle 15 is integral with a cam 25 which can actuate the movable blade 26 of a switch 27 which constitutes a signal emitting means at each rotation of the axle 15.

Figure 6:
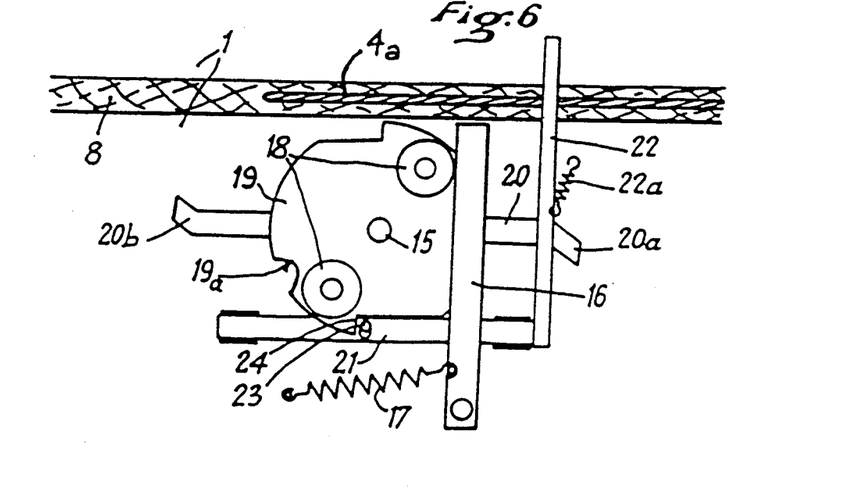
FIGS. 6-9 illustrate schematically from above, the different conditions of the device of FIG. 5.
Figure 7:
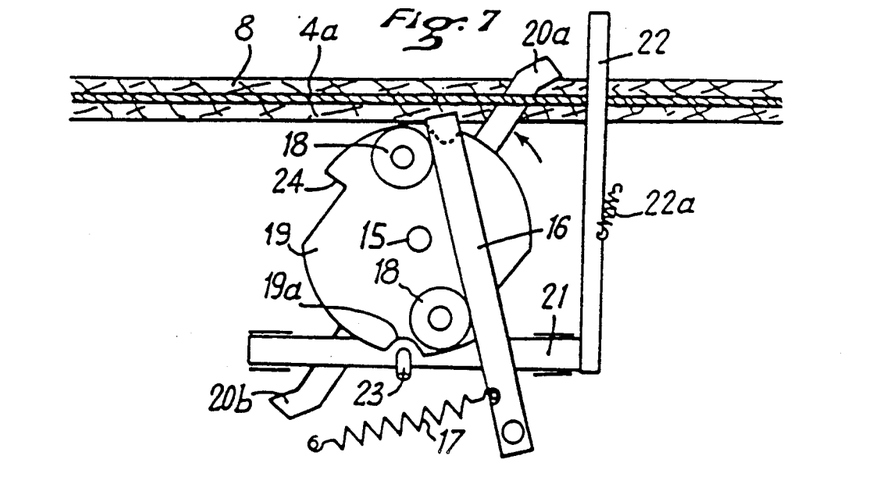

At FIGS. 6 to 9, elements identical to those already described, are allocated the same reference numbers. These figures schematically represent the different phases of the operating cycle of the detection device 10. FIG. 6 shows that strand 4a is placed under the lever 22 while lug 23 is housed in one of the notches 24 of the disk to lock it by being opposed to the thrust of the lever 16 urged by the spring 17 towards one of the abutments 18. In this position of the axle 15, fingers 20a and 20b are placed in a manner substantially parallel to the strand 4a of the binding material 4.

As seen with reference to FIGS. 1 to 4, the strand 4a being raised with respect to finger 22, progressively raises this latter. The lug 23 thus escapes from the notch 24 and the lever 16 urged by the spring 17 causes the disk 19 and the axle 15 to turn until they occupy the position represented in FIG. 7. The finger then slides under the strand 4a, while the lug 23 is maintained removed from the disk 19 by the binding material 4a acting on the finger 22. In this position of the disk 19, a notch 19a allows the finger 22 to fall back if the binding material 4a is broken and thus to actuate an alarm switch or any other defect warning system.

Figure 8:
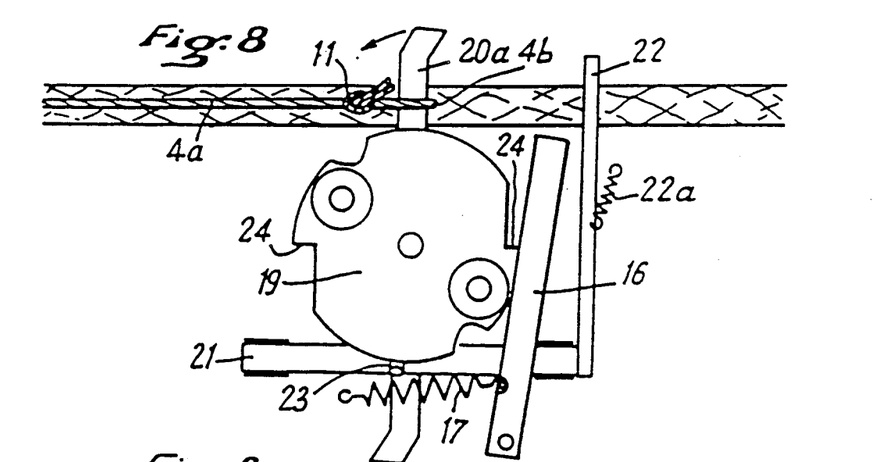

The knot 11 having been tied, the rear strand 4b of the loop encircling the bale 8 drives the finger 20a in a counterclockwise direction (cf. FIG. 8). The disk 19 is driven in the same direction and one of the abutments 18 pushes apart the lever 16 against the spring 17. In the meantime, due to the fact that the end of the bale 8 has arrived beyond the finger 22, this latter falls back drawn downwards by a biasing spring 22a and the lug 23 engages the periphery of the disk 19.

Figure 9:
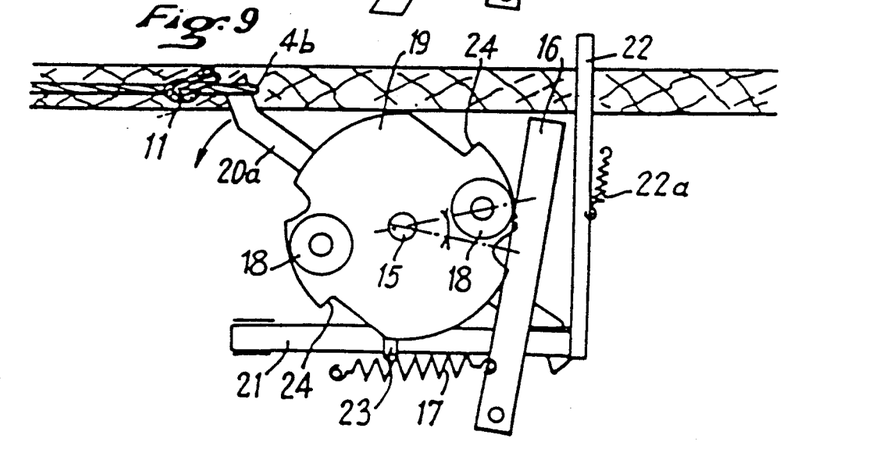

The driving in rotation of the finger 20a continues until strand 4b escapes from the finger 20a (cf. FIG. 9). At this time, the abutment 18 contacting with the lever has exceeded the jamming point, i.e. the point where the contact with the lever 16 and the abutment 18 coincide with the tangent point of the lever 16 at the path of the abutment 18. In these conditions, the lever 16 exerts a torque on the disk 19 which continues to turn in a counterclockwise direction until the lug 23 is housed in one of the notches 24 in a position symmetrical to that of FIG. 6 in which the lever 16 exerts a thrust on the disk 19. When the disk 19 is freed by disengaging of the lug 23, it will turn in a counterclockwise direction in order to place the finger 20b under the strand 4a of the following bale that thus takes its place under the finger 22 and the cycle recommences.

It is thus the initial presence of the strand 4a that allows a first rotation of the axle 15 carrying the bar 20 under the effect of the urging of the spring 17 and this rotation can be recorded by the contact 27, due to the cam 25 and the blade 26. This signal can thereafter be used to warn the driver that the placing in position of the binding material has been carried out correctly. The presence of a vertical rear strand 4b is thereafter detected by a second rotation of the axle 15 due to driving of finger 20a or 20b by the strand 4b which must present sufficient strength to overcome the reaction of the spring 17 that is opposed to the rotation of the disk 15. The choice of the characteristics of this spring thus sets the limit of the force to which it is desired that the loop (knot and binding material) resist. If the knot 11 or the binding material 4 are broken, the rotation of the axle 15 will not occur and will not be recorded by the switch 27, thereby provoking an alarm. Of course, it is possible to couple the signals emitted (or not emitted) by the sensor 27 with those of the advance sensor 12 of the bale on an AND gate, for example so as only to emit a warning signal to the extent where despite the detected advance of the bale, the presence of the strand 4a and/or the strength of the knot are defective.

One of the advantages of the invention resides in the double detection which is performed for each bale (presence of the binding material, presence of the knot) since it is known that more than half of the binding defects detected by earlier devices are due to the fact that the binding material is missing. According to the invention, the lack of binding material is detected well before the bale is completed and it is possible to intervene immediately on the bale or the knot, thereby avoiding needlessly completing the bale and having to take up again the nonbundled fodder. The invention also allows the strength of the knot to be tested if the attachment is performed by knotting.

It will be noted, furthermore, that the device which has been described herein-above does not use any external power source to operate. The reenergizing of the mechanical power accumulation motor that constitutes the disk 19, the abutments 18, the lever 16 and the spring 17, is operated by using part of the power transmitted to the straw bale for evacuating it outside the baling press. It is the traction exerted by the binding material that allows to reenergize the motor. The signal emitter has been represented on the figure in the form of an electric contact. It is, of course, possible to mount upon the end of axle 15, any other signalling device, optical, mechanical or sonar indicating to the driver the working condition of the baling press.

In one alternative (not represented) of the device, it is possible to connect to the finger 22 an electric switch that actuates a motor (or electro-magnet) acting on the bar 20 to position it transverse to the strand in order that it is hooked by the latter and brought back into its original position by this strand (assisted by a spring, if necessary). In another alternative (not represented) the finger 22 can be directly hinged about an axle 21 carried by the axle 15.

Figure 10:
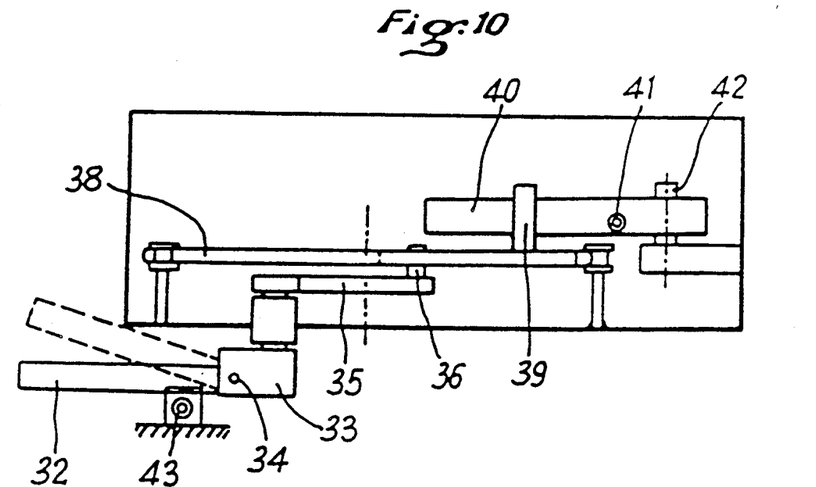
FIGS. 10 and 11 represent schematically from side and from above a second embodiment of the invention.
Figure 11:
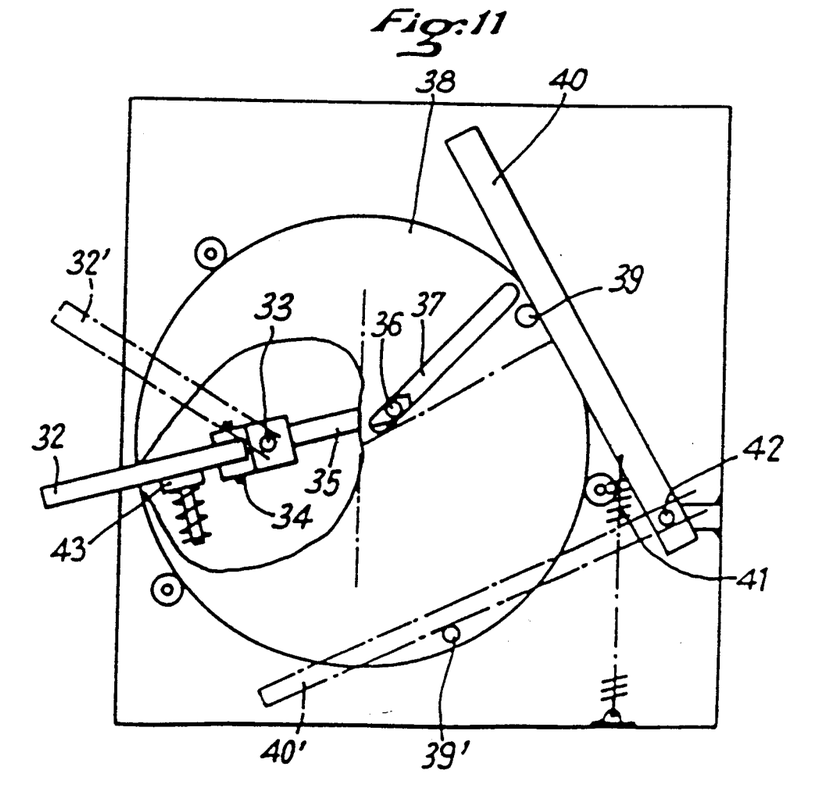

FIGS. 10 and 11 represent schematically another embodiment of the device according to the invention. The operating principle is substantially identical to that of the device represented in FIGS. 5 to 9, namely that it uses a mechnical power accumulation motor, but that the finger detecting the strand and the finger detecting the loop (or the knotting) coincide in a single finger. To carry this out, a specific transmission system between a lever 40 returned by a spring 41 and a single detection finger 32 is used.

Finger 32 is borne by an axle 33 in a bearing of housing 13 and is, furthermore, pivotally connected to the axle 33 about a rocking axle 34 perpendicular to axle 33. This pivoting connection is limited, since only upwards movements, from a horizontal position of the lever 32, are possible. Opposite the lever 32 and inside the housing 13 (the finger 32 being outside this housing), the axle 33 carries a coupling arm 35 provided with a snug 36 housed in the radial groove 37 of a disk 38, turning in the housing 13 around an axle parallel to axle 33. The disk 38 comprises a crank pin 39 on which abuts permanently. The lever 40 urged by the spring 41 (fulfilling the functions of the lever 16 and of the spring 17 of the foregoing figures).

It will be understood that the two positions of the lever 40 tangentially to the trajectory of the crank pin 39 define two angular ranges, one covering more than 180°, opposite to the hanging point 42 of the lever 40 on the housing 13 with respect to the center of the disk 38, and the other smaller than 180° on the side of this point 42 with respect to the center of the disk. In the largest of these ranges, the lever returns the disk 38 in a counterclockwise direction and the disk 38 can drive the finger 32 over more than a half-turn (in the same direction of rotation) about the axle 33. In the smaller of these ranges, it is necessary to rotate the disk 38 against the return force of the spring 41. It is finger 32 that thus constitutes the motor element (over at least a half-turn).

An abutment 43 located on the trajectory of the finger 32 stops this finger close to the angular position that corresponds to the maximum of power accumulated in the spring 41 when the action of the lever 40 on the disk 38 generates a motor torque in a counter-clockwise direction. This abutment 43 is retractable and partially resilient for the following reasons.

At the beginning of preparing a fresh bale, the binding material or twine passes under the finger 32, this latter engaging the abutment 43. The binding material raises the finger 32 about its axle 33 thereby freeing it from the abutment 43. The torque exerted by the lever 40 on the disk 38 provokes a rotation of this latter which, due to the engagement of the snug 36 in the groove 37, causes it to turn the finger 32 about the axle 33 in the same direction in order to bring it into position 32'. The lever 40 reaches the position 40' where its action on the crank pin which has come into position 39' does not produce a torque since it thus acts according to a radius of the disk. During its passage from the initial position to position 32', the finger 32 escapes from the contact with the binding material and slides between this latter and the fodder bale. During passage from one end of the bale, the finger 32 is hooked by the binding material which drives in rotation the disk 38 against the reaction of the lever 40 urged by the spring 42. The finger 32 thus rests on the abutment 43 which is compressed to allow the binding material to escape from the end of the finger 32. When the binding material has left this end, the abutment 43 assumes again its normal position, since its spring return effect is greater than that exerted by spring 41 urging the lever 40. The finger is thus again placed on the trajectory of a strand 4a of the binding material, but this time above it and the cycle can thus start again.

It is well understood that the disk 38 is connected to an actuating member of a displacement sensor of this disk and thus of the finger 32. The signals from this sensor ca be used as in the foregoing case.

As in the previous embodiment, the finger 32 can, in an alternative, act on the control circuit of a motor driving it in rotation in order to allow it to pass from the position located above the strand to a position located underneath it. This action of the motor intervenes during the rocking of the finger 32 about the axle 34. The motor causes it to execute a complete turn until the abutment 43 of which the resistance to compression or crushing determines the resistance strength threshold of the knot.

Figure 12:
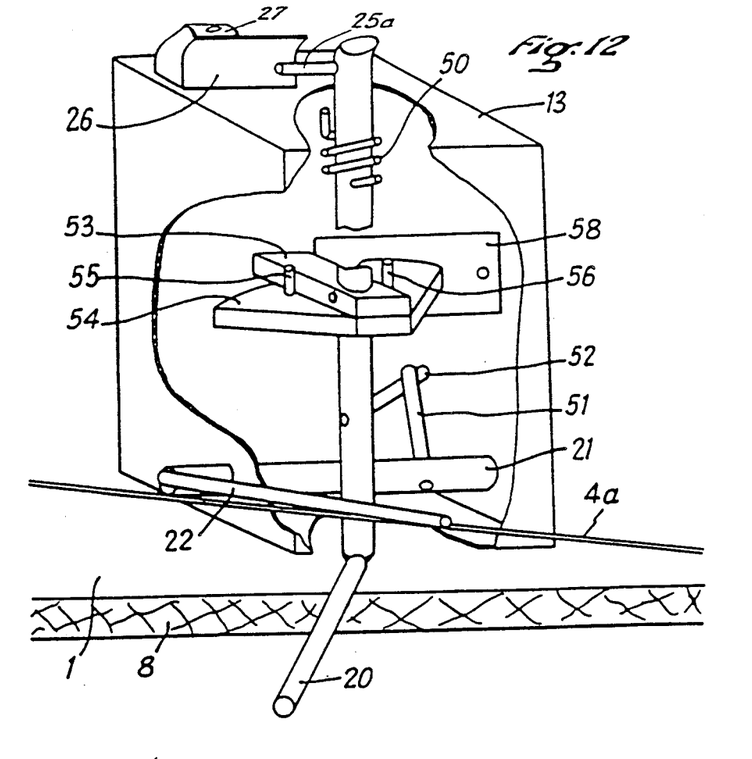
FIG. 12 represents schematically and in perspective a third embodiment of the invention.
Figure 13:
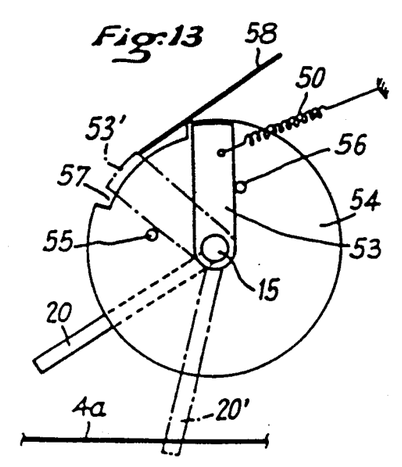
FIGS. 13 and 14 illustrate schematically two operating phases of the device of FIG. 12.
Figure 14:
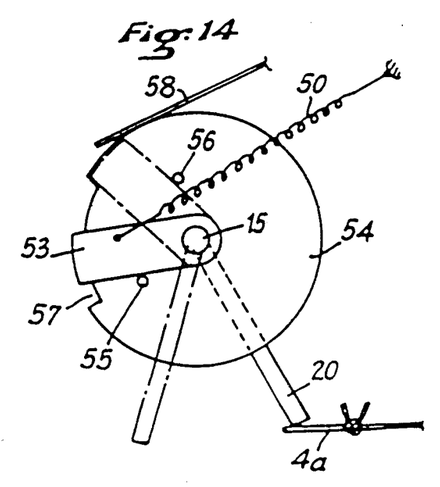

The third embodiment of the invention represented in FIGS. 12, 13 and 14 differs from the previous ones by the fact that the motor member that places the second finger in active position is constituted by the first finger itself.

In the housing 13, the axle 15 bears on its lower part the second finger 20 and on its upper part a finger 25a that cooperates with the blade 26 of the switch 27, in the same way as the cam 25 of FIG. 5. The axle is connected to a return spring 50 which tends to cause it to turn in a clockwise direction until it contacts with an abutment (not represented).

The first finger 22 is, as in the case of FIG. 5, pivotally connected to an axle 21 perpendicularly to axle 15 in order to be raised by the strand 4a. The rotation of the axle 21 against the spring 50 is transmitted to the axle 15, by cooperation of two fingers or fingers 51 and 52, respectively integral with axles 21 and 15. This coupling can be achieved by any other appropriate means (for example, with an angle gear).

In the median part, the axle 15 is integral with a bar 53 which is perpendicular thereto and which drives a cam 54, capable of free rotation with respect to axle 15, by means of two short pins 55 and 56. This cam 54 is circular and presents a radius equal to or slightly greater than the length of the bar and is provided with a recess 57 located at its periphery and so that, when the little bar rests on the short pin 55, its free end protrudes into the recess 57. Engaging the short pin 56, the bar 53 is at least partially outside the recess 57. A spring blade 58, tangent to the cam 54, forms an abutment for the bar 53 when this latter is housed in the recess 57. This abutment is suppressed by the cam 54 as will be seen hereafter.

The original position of the device is represented by FIG. 13 (elements in full lines). The finger 22 is in a retracted position and remains in its retracted position outside the path of the strand 4a. The spring 50 maintains the finger in this position, i.e. with the bar 53 engaging the short pin 56 (it is supposed that the cam 54 is in abutment against an element of housing 13).

The finger 22 is then raised by the strand 4a and the finger 51 pushes finger 52. The axle 15 and the bar 53 rotate in a counterclockwise direction. The bar 53 is displaced towards the recess 57 by raising the blade until it extends beyond this blade (position 53' in mixed lines on FIG. 13). In this position, the finger 51 breaks contact with the finger 52 and can continue to pivot downwards if the binding material 4a continues to raise the finger 22. The backward movement of bar 53 is prevented by the blade 58 and the finger 29 is maintained in its position 20' under the binding material 4a which carries along the finger 20. The axle 15 and the bar 53 thus turn against the spring 50, driving the cam 54 by the short pin 55 (position represented in full lines on FIG. 14). The finger then breaks contact with the strand 4a. The spring 50 returns the bar 53 against the short pin 56, thus at least partially inside the outline of the cam 54 which maintains the blade 58 raised (position in mixed lines on FIG. 14). Then, the assembly returns to the original position. The finger 22 falls back in the absence of the strand and the finger 52 again comes to be placed under the finger 51 which is thus in its high position.

The invention presents the particular advantage that it can be adapted to all existing baling presses, and in an extremely simple manner. It allows with reduced costs to increase the yield of the baling press by about 5 to 10% by allowing rapid detection of defects for which it is known that they are in large part due to lack of binding material in the binding system.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. A device for controlling the binding of bales of material formed on an agricultural baling press fitted with a binding system, in which the loop of a binding material is made around the bale progressively during compression of the material, wherein the device comprises:
   a first finger for detecting presence of the binding material, the first finger is placed above the binding material at a distance therefrom so that an upper horizontal strand of the binding material is brought into contact during shaping of the bale to progressively raise the first finger;
   a second detecting finger for detecting shaping of the binding loop, the second finger is placed in an active position between the binding material and the bale and is movable to a retracted position, the second finger being carried along with an axle substantially perpendicular to the binding material by the passage of a rear vertical strand of the binding material;
   a motor member cooperating with the second finger to return the second finger from the retracted position to the active position in response to raising of the first finger by the binding material; and
   a signal transmitter which is energized upon rotation of the axle, the transmitter indicating one of absence and rupture of the binding material during formation and knotting of the binding loop.

2. The device according to claim 1, wherein the motor member comprises a mechanical energy accumulation motor reenergized by driving of the second finger by movement of the binding material.

3. The device according to claim 1, wherein the first finger cooperates with a retaining abutment of the second finger in the retracted position, in an unstable position of the motor member opposed to the actuating of the second finger towards the active position whereat the motor member has a lowest level of accumulated energy.

4. The device according to claim 1, wherein the second finger comprises opposed ends of a bar hitched by a medium portion thereof to the end of an axle driven by the motor member, and a spring blade resiliently positioned on two abutments and integral with rotation of the axle for driving the bar, each forming a cam surface for engaging a lever urged by a spring to push the second finger into the active position, when the retaining abutment is suppressed by the first finger.

5. The device according to claim 1, wherein the transmitter cooperates with a sensor controlling advancing of the bale in the baling press.

* * * * *